US009104493B2

(12) United States Patent
Molkov et al.

(10) Patent No.: US 9,104,493 B2
(45) Date of Patent: Aug. 11, 2015

(54) SYSTEM AND METHOD FOR CLUSTER MANAGEMENT

(71) Applicant: Facebook, Inc., Menlo Park, CA (US)

(72) Inventors: Dmytro Molkov, Menlo Park, CA (US); Ramkumar Venkat Vadali, Mountain View, CA (US); Chun-Yang Chen, Sunnyvale, CA (US); Joydeep Sen Sarma, Fremont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 206 days.

(21) Appl. No.: 13/670,199

(22) Filed: Nov. 6, 2012

(65) Prior Publication Data
US 2014/0130054 A1    May 8, 2014

(51) Int. Cl.
*G06F 9/50* (2006.01)
(52) U.S. Cl.
CPC ...... *G06F 9/5072* (2013.01); *G06F 2209/5013* (2013.01)
(58) Field of Classification Search
None
See application file for complete search history.

(56) References Cited

U.S. PATENT DOCUMENTS

| 2005/0165881 A1* | 7/2005 | Brooks et al. ............... 709/200 |
| 2009/0043873 A1* | 2/2009 | Barsness et al. ............. 709/223 |
| 2012/0226797 A1* | 9/2012 | Ghosh et al. ................ 709/224 |
| 2013/0104140 A1* | 4/2013 | Meng et al. ................. 718/104 |
| 2013/0151707 A1* | 6/2013 | Boutin et al. ............... 709/226 |

OTHER PUBLICATIONS

Shafer, Jeffrey. A Storage Architecture for Data-Intensive Computing. [online] (May 2010). ProQuest, UMI., pp. 1-166. Retrieved From the Internet <http://scholarship.rice.edu/bitstream/handle/1911/62014/3421190.PDF?sequence=1>.*
Isard et al. Quincy: Fair Scheduling for Distributed Computing Clusters. [online] (2009). ACM., pp. 1-20. Retrieved From the Internet <http://catbert.cs.duke.edu/courses/fall13/compsci590.4/838-CloudPapers/Quincy.pdf>.*

* cited by examiner

*Primary Examiner* — Emerson Puente
*Assistant Examiner* — Jonathan R Labud
(74) *Attorney, Agent, or Firm* — Perkins Coie LLP

(57) ABSTRACT

A system and method of managing a cluster of distributed machines is described. A cluster manager receives status updates regarding tasks running on each machine in the cluster from a task tracker running on the machine. The cluster manager receives resource requests from a job tracker created by a client wishing to run a job in the cluster. The cluster manager is responsible for implementing push-based fair scheduling of resources to the job trackers. The job tracker is responsible for running tasks for one job in the resource identified by the cluster manager. In one embodiment, the job tracker can run in the client for small jobs and in the cluster for larger jobs. The cluster manager can also be restarted, for example, for software updates without restraining the cluster.

21 Claims, 13 Drawing Sheets

SYSTEM AND METHOD FOR CLUSTER MANAGEMENT

BACKGROUND

Hadoop's MapReduce has a single node called JobTracker that is responsible for running all jobs. However, both memory capacity and processing availability can become a problem for this node. The memory is filled up with the statistics for each of the tasks of the jobs, while the processor is busy scheduling and updating the statistics of the currently running tasks. Further, because of the single lock used in the design of the JobTracker, its parallelism is limited.

Additionally, if fair scheduling is implemented so that many clients can share a machine cluster and run their jobs in parallel on a small subset of the resources of the cluster, thousands of jobs and millions of tasks are stored in memory, thus, effectively filling up the JobTracker heap. Moreover, the fair scheduler has heavy scheduling cycles, further compounding processing problems.

Because of the problems with the memory capacity and processor availability, JobTracker has a limit to the number of tasks it can hold in memory. Beyond this limit, the fair scheduling iterations become too expensive and tasks are finished slower than they enter into the system, thus, further slowing down the JobTracker.

BRIEF DESCRIPTION OF THE DRAWINGS

Examples of a method and system for managing a cluster of machines are illustrated in the figures. One or more embodiments of the present disclosure are illustrated by way of example and not limitation in the figures of the accompanying drawings.

DETAILED DESCRIPTION

A system and method of managing a cluster of distributed machines is described. A cluster manager receives status updates regarding tasks running on each machine in the cluster from a task tracker running on the machine. The cluster manager receives resource requests from a job tracker created by a client wishing to run a job in the cluster. The cluster manager implements push-based fair scheduling of resources to the clients. In one embodiment, the job tracker can be run in the client for small jobs or in the cluster for larger jobs. The cluster manager can also be restarted, for example, for software updates without restraining the cluster.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

General Description

Figure 1A:
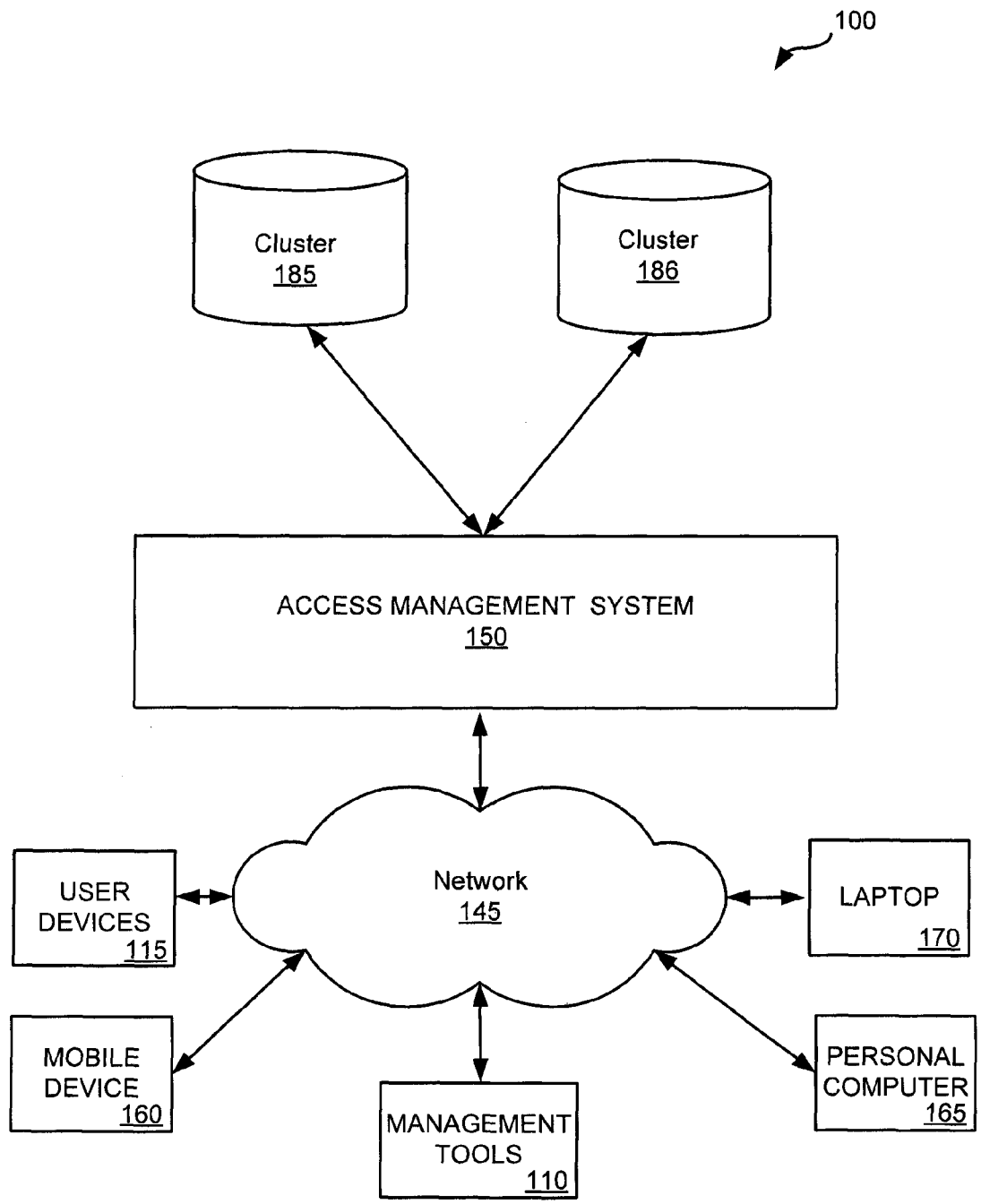
FIG. 1A depicts an example of a networked-based environment in which some embodiments of the present invention may be used.

FIG. 1A illustrates an example of a networked-based environment 100 in which some embodiments of the present invention may be utilized. Companies can store a tremendous amount of data (e.g., photographs, messages, e-mails, electronic documents, or healthcare records) and related analytics (e.g., usage analytics). The data can be submitted through various management tools 110, user devices 115, mobile devices 160, personal computers 165, laptops 170, and/or other devices to allow the data to be stored on one or more databases in data center clusters 185 and 186. As illustrated in FIG. 1A, these devices and tools may use network 145 to submit and retrieve information from the clusters 185 and 186. Various embodiments of the present invention use access management system 150 to manage the access that the users (both end-users and employees) have to the information and data stored in clusters 185 and 186.

User device 115 can be any computing device capable of receiving user input as well as transmitting and/or receiving data via the network 145. In one embodiment, user device 115 is a conventional computer system, such as a desktop 165 or laptop computer 170. In another embodiment, user device 115 may be mobile device 160 having computer functionality, such as a personal digital assistant (PDA), mobile telephone, smart-phone or similar device. User device 115 is configured to communicate with access management system 150, and/or the financial account provider via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 208, such as IOS® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Figure 1B:
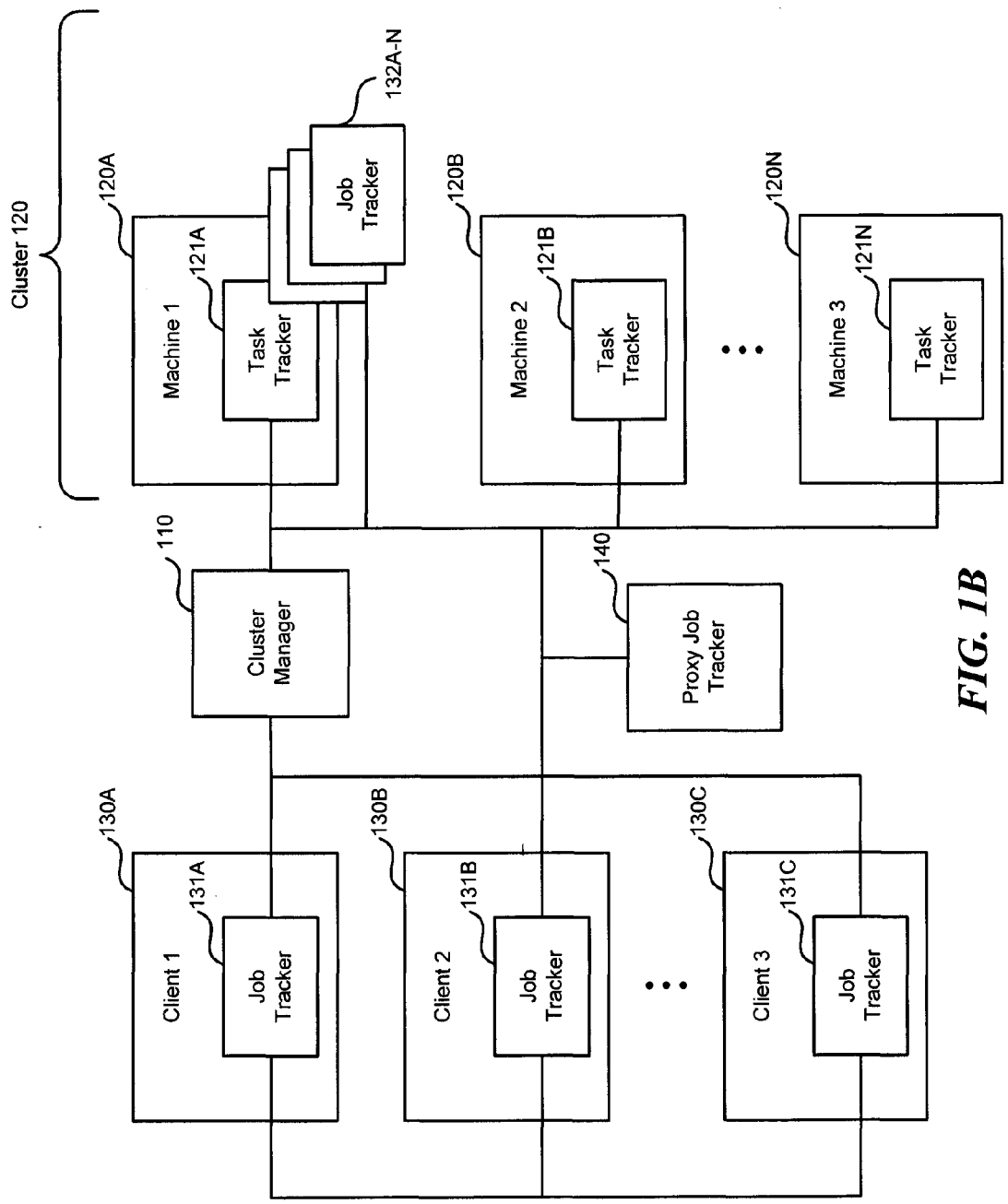
FIG. 1B depicts an example block diagram of a system in which cluster management techniques are implemented according to an embodiment of the present disclosure.

A cluster can include up to thousands of machines available to store data and perform tasks, such as analyzing and processing data in parallel. FIG. 1B depicts an example layout of components for one embodiment of the cluster management techniques described herein. A client 130A-N running on a user device 115 that wants to run a job on a machine in cluster 120 for analyzing and/or processing data creates a job tracker 131A-N, 132A-N that sends a resource request to a cluster manager 110. The cluster 120 includes multiple machines 120A-N, and the cluster manager 110 is responsible for scheduling machine resources for jobs that are run on the machines 120A-N.

Each machine 120A-N runs a task tracker 121A-N that tracks the status of tasks, such as map tasks and reduce tasks, that are running on that particular machine. The task trackers 121A-N communicate with the cluster manager 110 about the status of tasks running on the respective machine. When the cluster manager 110 is unavailable, the proxy job tracker 140 responds to communications sent to the cluster manager 110.

Figure 2:
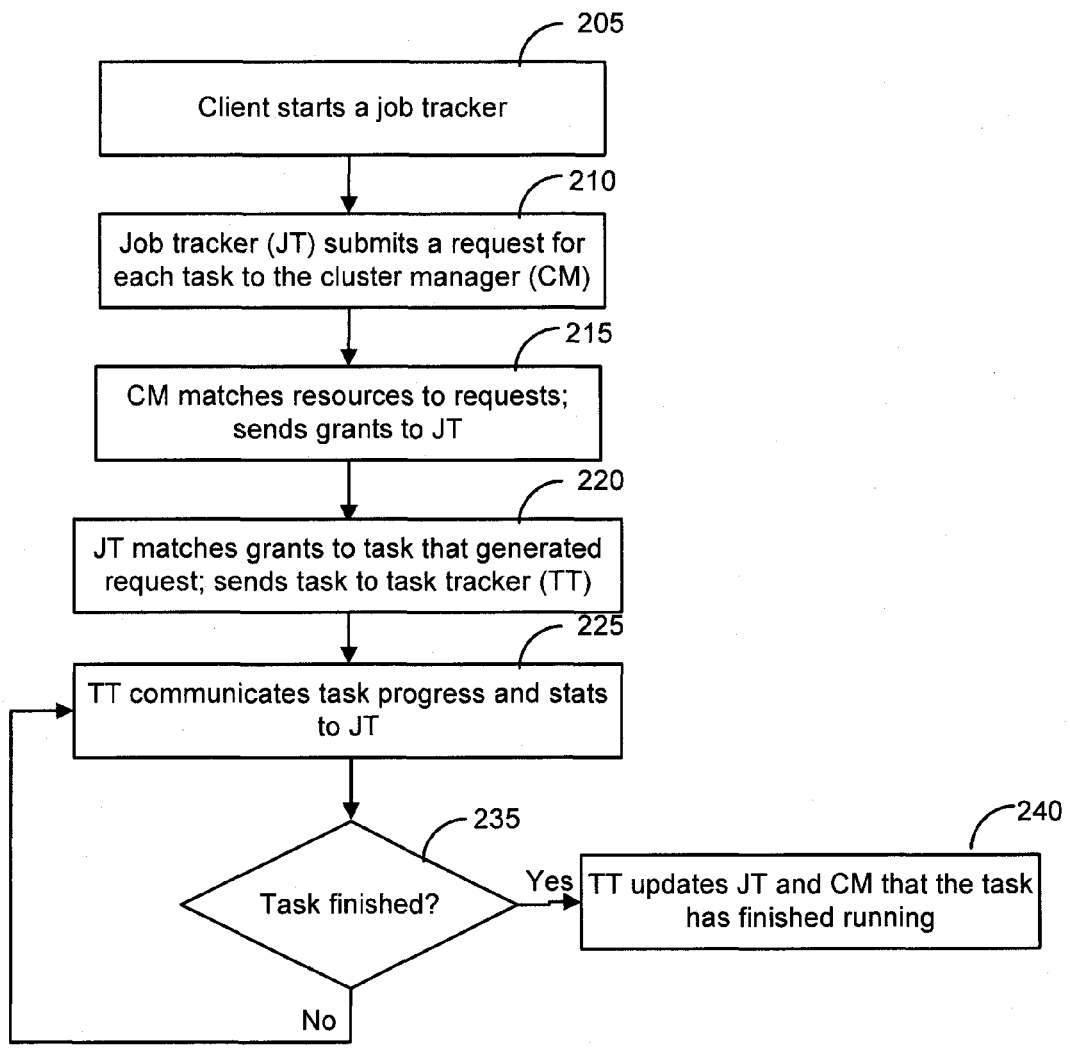
FIG. 2 is a flow diagram illustrating an example communications process for running a job in a machine cluster according to an embodiment of the present disclosure.

FIG. 2 is a flow diagram illustrating an example communications process related to running a job in the cluster 120. At block 205, a client running on a user device 115 wanting to run a job on machines 120A-N in cluster 120 creates a job tracker.

In one embodiment, a job tracker 131A-N can be created inside the respective client 130A-N, and the client 130A-N submits the job to the job tracker 131A-N. A separate job tracker is created by the client for each job to be run so that the job tracker only needs sufficient memory and processing power to run a single job. However, many tasks may need to be performed in conjunction with the single job.

In another embodiment, the client 130A-N can create a job tracker 132A-N, inside the cluster 120. The client 130A-N requests from the cluster manager 110 a machine inside the cluster 120 on which to run the job tracker 132A-N. One of the criteria used to determine whether the job tracker is run inside the client or inside the cluster is the size of the job. Small jobs are run inside the client to minimize the latency of short jobs by reducing delays that occur in scheduling. Thus, if a job includes fewer than a threshold number of tasks, for example 1000 tasks, the job is considered a small job, and the job tracker is run inside the client. If a job includes greater than the threshold number of tasks, the job tracker is run inside the cluster to reduce the number of communications sent between the client and the cluster. A person of skill in the art will appreciate that the threshold number of tasks can differ from 1000. In one embodiment, the threshold number of tasks can be dynamically set. In one embodiment, the threshold number of tasks can be manually set.

Another criterion that can be used to determine whether the job tracker is run inside the client or inside the cluster is the relative locations of the client and the cluster. If the client and the cluster are located at the same datacenter, the threshold limit for the number of tasks that correspond to a small job can be set higher.

Then at block 210, the job tracker 131A-N, 132A-N submits a resource request for each task it has to run for the job to the cluster manager 110. The resource request includes information about how many map tasks or reduce tasks need to be performed.

Next, at block 215, the cluster manager 110 matches available resources within the machines 120A-N in the cluster 120 to the resource request and sends a resource grant back to the job tracker if resources are available for performing the requested tasks. The resource grant includes information about which task tracker the task should be sent to, for example, an internet protocol (IP) port of the task tracker associated with the machine that has available resources to run the requested task.

If no resources are available when the resource request is sent, the job tracker does not have to re-submit the resource request. The cluster manager 110 will monitor the availability of resources in the cluster 120 and automatically send the resource request to the job tracker when the resource becomes available. This is known as push-based scheduling.

At block 220, the job tracker 131A-N, 132A-N matches the resource grant to the task that generated the resource request and then pushes the task action to the task tracker 121A-N identified in the resource grant.

Then at block 225, the task tracker 121A-N communicates the task progress and statistics related to the task, such as total time the task has been running, back to the job tracker running the job. In one embodiment, the task trackers 121A-N also send information about the running tasks on the machine to the cluster manager 120.

At decision block 235, if the task has not finished (block 235—No), the process returns to block 225, where the task tracker 121A-N sends an update on the task progress to the job tracker 131A-N, 132A-N at regular intervals. If the task has finished (block 235—Yes), at block 240, the task tracker 121A-N updates both the job tracker 131A-N, 132A-N and the cluster manager 110 that the task has finished running.

There can be up to thousands of machines 120A-N running in the cluster 120. The cluster manager 110 tracks the information provided by each task tracker 121A-N running on the thousands of machines to determine the availability of resources in the cluster. The cluster manager 110 can hold millions of objects in memory that correspond to the outstanding resource requests from the job trackers 131A-N, 132A-N as well as session states that include a mapping of resource requests to granted resources.

The task tracker 121A-N sends heartbeats to the cluster manager 110 to inform the cluster manager 110 that the machine is alive. The heartbeats can include a description of the machine's capabilities, for example, the number of central processing units (CPUs) and the number of terabytes of disk space that the machine has, and the number and type of tasks that are currently running on the machine.

Based on the description of the machine, the cluster manager 110 can determine how many tasks of a certain type, for example, map tasks and reduce tasks, can run on the machine.

Thus, resources are granted by the cluster manager 110 based on the number and type of tasks reported by the task trackers 121A-N to be running on the machines of the cluster 120, rather than on the amount of physical resources available, for example, the number of CPUs available on each machine. By determining the number of tasks available to be run on a machine, finer grained decisions regarding the availability of resources in the cluster 120 can be made by the cluster manager 110.

If the cluster manager 110 fails to receive an expected heartbeat from a task tracker 121A-N, the cluster manager assumes that the machine on which the task tracker was running has gone down and tasks that the machine was running have terminated.

The cluster management techniques discussed herein use push-based scheduling, that is, as resources become available on the machines 120A-N in the cluster 120, resource grants are sent by the cluster manager 110 in response to resource requests received from clients 130A-N. Thus, as resources become available in the cluster 120, the cluster manager 110 pushes the resources back to the job trackers 131A-N, 132A-N through resource grants.

In contrast, other traditional systems rely on pull-based scheduling where a job tracker must keep requesting whether a resource is available until it receives the needed resources. Further, in other traditional systems, resource requests are made for a specified amount of physical resources, such as CPUs, rather than by the number and type of tasks, such as map tasks and reduce tasks, to be run.

Restarting a Job Tracker Inside the Cluster

In the case where the client creates a job tracker 132A-N in the cluster 120, the job tracker 132A-N will transmit heartbeats to the client. If the client regularly receives heartbeats from the job tracker, the client knows that the job tracker is running. However, a machine 120A-N in the cluster 120 can stop running due to hardware or software problems, and if a job tracker 132A-N is running on that machine, the job tracker 132A-N will also stop. Thus, it is important to let the client know that the job tracker 132A-N has stopped running so that the client can restart the job tracker.

Figure 3:
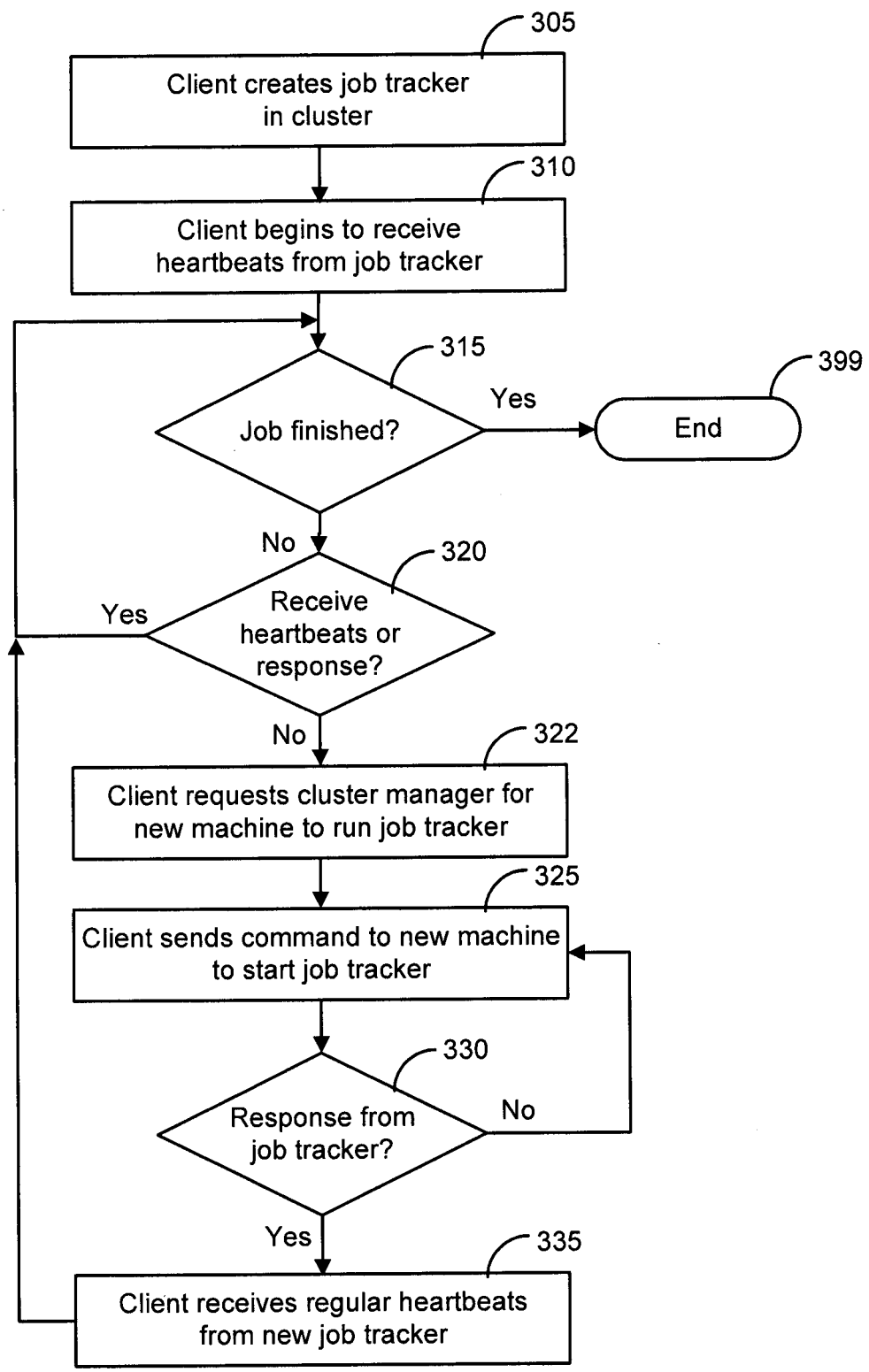
FIG. 3 is a flow diagram illustrating an example process for restarting a job tracker created inside a cluster according to an embodiment of the present disclosure.

FIG. 3 is a flow diagram illustrating an example process for restarting a job tracker created inside a cluster. At block 305, the client creates a job tracker 132A-N in a machine in the cluster 120. Once started, at block 310, the job tracker 132A-N transmits heartbeats regularly to the client. The heartbeats include status information of the job requested by the client, for example, whether a resource grant was sent and the progress of the job.

Then at decision block 315, the client determines whether the job requested to be run by the job tracker has finished. If the job was reported by the job tracker to have finished (block 315—Yes), the process ends at block 399.

If the job was not reported by the job tracker to have successfully completed (block 315—No), at decision block 320, the client determines whether the job tracker has stopped sending heartbeats. If the client receives heartbeats from the job tracker, or alternatively, if the client tries to communicate with the job tracker to ask for the current status of a job and receives a response (block 320—Yes), the process returns to decision block 315 to determine whether the job has finished.

If the client stops receiving heartbeats or does not receive a response when attempting to communicate with the job tracker (block 320—No), at block 322 the client sends a request to the cluster manager for a new machine on which to run the job tracker.

Upon receiving information regarding which machine the job tracker should be run on, at block 325, the client sends a command to the new machine to create a new job tracker.

Then at block 335 the client receives regular heartbeats from the newly started job tracker. The process returns to decision block 315 to determine whether the job has finished.

Note that the cluster manager 110 does not need to track the job tracker 132A-N or restart the job tracker 132A-N if the machine goes down. In this cluster management scheme, the client 130A-N is responsible for tracking the job tracker 132A-N because the job is only important to the client. If the client process is gone, then no other entity in the system cares about what happens to the rest of the job and whether or not the job tracker 132A-N is running.

Fair Share Scheduling and Preemption

In one embodiment, the cluster management techniques discussed herein are designed to implement fair share scheduling where the cluster resources are equally distributed among requesting clients. Thus, if a first client runs a job that occupies the entire cluster, and a second client wants to run another job, the first job will be preempted so that the available resources can be equally distributed between the two clients.

Figure 4:
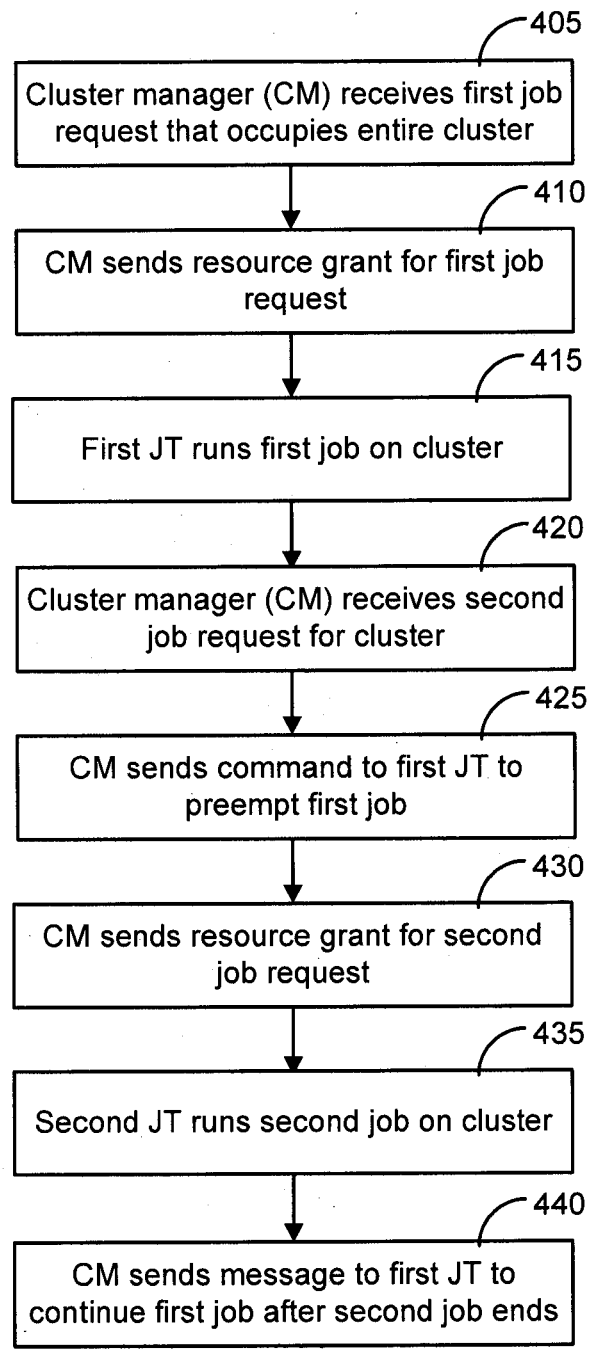
FIG. 4 is a flow diagram illustrating an example process of preempting a job according to an embodiment of the present disclosure.

FIG. 4 is a flow diagram illustrating an example process of preemption to ensure fair share scheduling of resources for the case of two clients competing for resources. At block 405, the cluster manager 110 receives a first job request from a job tracker created by a first client. In this example, the requested job will use the resources of the entire cluster 120. Then at block 410, the cluster manager 110 sends a resource grant for the job request to the job tracker of the first client when the resources are available. And at block 415, the job tracker runs the tasks of the job on the cluster.

Next, at block 420, the cluster manager 110 receives a second job request from a job tracker created by a second client for running in the cluster 120. To ensure fair share scheduling of resources between the two clients, at block 425 the cluster manager 110 sends a command to the first job tracker running the first job request to pre-empt the first job because the first job is unfairly using more than half of the resources of the cluster. Because the first job requires the resources of the entire cluster, the first job will be temporarily interrupted. The cluster manager 110 can send the preemption command to the first job tracker at any time, i.e., the cluster manager 110 does not wait for a heartbeat from the job tracker before sending the preemption command.

Then at block 430, the cluster manager sends a resource grant for the second job request to the second client's job tracker. At block 435, the second client's job tracker runs the second job on the cluster 120. When the task tracker tracking the second job reports to the cluster manager 110 that the second job has finished, at block 440, the cluster manager 440 sends a message to the first job tracker that it can again use the cluster's resources to continue running the first job.

Restarting the Cluster Manager

With traditional cluster management techniques, if a cluster manager needs to be restarted, for example, to update and release new cluster manager software, the machines and sessions that communicate with the cluster manager also go down. CPU time previously invested in running jobs in the cluster is wasted, and all of the running jobs must be restarted after the cluster manager is running again.

Figure 5:
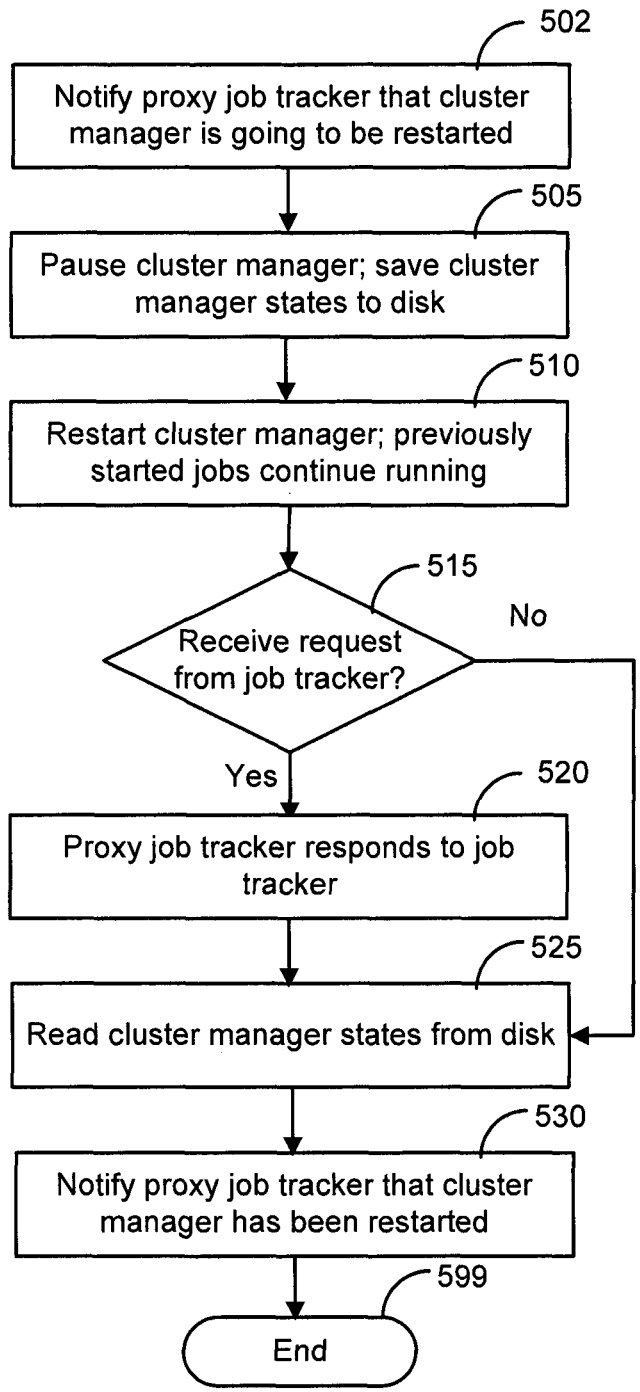
FIG. 5 is a flow diagram illustrating an example process for restarting the cluster manager according to an embodiment of the present disclosure.

In contrast, with the cluster management techniques disclosed herein, the cluster manager can be restarted transparently so that machines and sessions connected to the cluster manager at the beginning of the restart of the cluster manager do not time out while the cluster manager is down. Further, the cluster manager retains the state it had before the restart so that sessions that were active before the restart are not invalidated, and the resource grants made before the restart are still respected. When the cluster manager 110 is restarted, the jobs running in the cluster 120 can continue to run because the job trackers 131A-N, 132A-N are external to the cluster manager 110. FIG. 5 is a flow diagram illustrating an example process for restarting the cluster manager.

At block 502, the cluster manager 110 notifies the proxy job tracker 140 that it is going to be restarted. In one embodiment, the cluster manager 110 sets a safe mode flag on the proxy job tracker 140 and sets its own safe mode flag. Then any new requests sent to the cluster manager 110 will know that the cluster manager 110 is unavailable and that the requesters should periodically poll the proxy job tracker 140 to find out whether the cluster manager 110 is available again.

The cluster manager 110 opens and maintains a new session for every job that is tracked by a job tracker 131A-N, 132A-N, and each session includes a mapping from the resource requests of the job tracker to resource grants. At block 505, the cluster manager 110 is paused, and the cluster manager's session states are saved to a file on disk to persist its state.

Then at block 510, the cluster manager 110 is restarted. During the restart, the cluster manager 110 is unavailable to respond to requests. However, the jobs that are running continue to run except when the task trackers need to communicate with the cluster manager 110. In that case, the task trackers will pause and wait for the cluster manager 110 to come back online while periodically polling the proxy job tracker 140 to identify when the cluster manager 110 is available again.

The proxy job tracker 140 responds to communications sent to the cluster manager 110 when the cluster manager is unavailable. At decision block 515, if a resource request is sent by a job tracker 131A-N, 132A-N to the unavailable cluster manager 110, the proxy job tracker 140 responds to the job tracker. The job tracker is told to wait until the cluster manager 110 becomes available again. In one embodiment, the proxy job tracker 140 notifies the job tracker 131A-N, 132A-N when the cluster manager 110 is available again. In one embodiment, the proxy job tracker 140 responds to requests by informing the job trackers that the cluster manager is still unavailable.

At block 525, after the cluster manager 110 has been restarted, the cluster manager's stored states are read from the file on disk and restored. Thus, the cluster manager 110 will have the same state as it had before it was restarted, and the jobs resume with no loss of any computations performed before the restart of the cluster manager.

Then at block 530, the cluster manager 110 notifies the proxy job tracker 140 that it has been restarted. In the embodiment discussed above where the cluster manager 110 set its safe mode flag before being restarted, the cluster manager 110 unsets its safe mode flag and also unsets the proxy job tracker's safe mode flag. The process ends at block 599.

Figure 6:
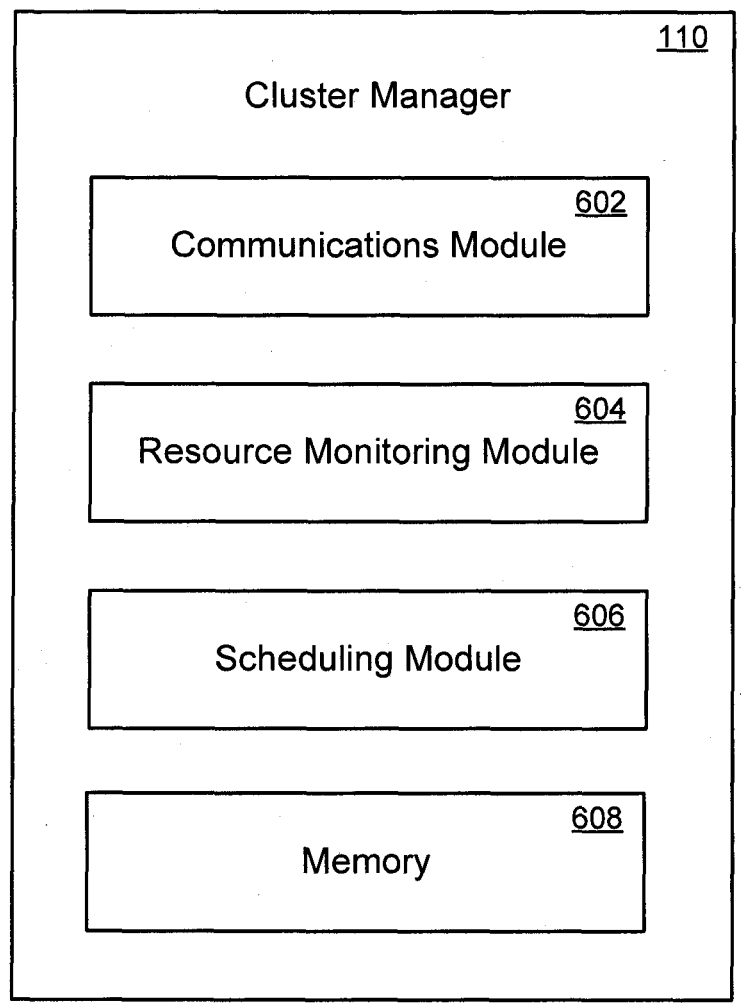
FIG. 6 depicts an exemplary architecture of a cluster manager according to an embodiment of the present disclosure.

FIG. 6 is an example of an architecture of the cluster manager 110 configured, for example, to receive resource requests and provide resource grants based on the availability of resources in a machine cluster. In the example of FIG. 6, the cluster manager 110 (and all of the elements included within the cluster manager 110) is implemented by using programmable circuitry programmed by software and/or firmware, or by using special-purpose hardwired circuitry, or by using a combination of such embodiments.

In the example of FIG. 6, the cluster manager 110 includes a communications module 602, a resource monitoring module 604, a scheduling module 606, and a memory 608. Additional or fewer components or modules can be included in the cluster manager 110 and each illustrated component.

As used herein, a "module" includes a general purpose, dedicated or shared processor and, typically, firmware or software modules that are executed by the processor. Depending upon implementation-specific or other considerations, the module can be centralized or its functionality distributed. The module can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, the cluster manager 110 includes a communications module 602 configured to receive resource requests from job trackers 131A-N, 132 A-N, send resource grants to the job trackers based upon availability of resources, and send preemption commands to the job trackers. The communications module 602 is also configured to receive heartbeats from the task trackers 121A-N running on the machines 120A-N in the cluster 120. In one embodiment the communications module 602 is also configured to receive task status updates from the task trackers 121A-N running on the machines 120A-N in the cluster 120.

In one embodiment, the cluster manager 110 includes a resource monitoring module 604 configured to track the availability of resources in the machines 120A-N based upon the communications received from the task trackers 121A-N. The resource monitoring module 604 can receive a request for resources to perform a specified number of tasks, and based on the machine descriptions and currently running tasks on each machine reported by the task trackers, the resource monitoring module 604 can determine whether there are sufficient resources to accommodate the resource request. The scheduling module 604 maps a resource request to an available resource, and works in conjunction with the communications module 602 to send a resource grant in response to a resource request.

In one embodiment, the cluster manager 110 includes a scheduling module 606 configured to track the total amount of resources a client 130A-N is using to ensure that fair scheduling of resources is implemented. When one or more clients are determined to be using more than their share of resources, the scheduling module 606 works in conjunction with the communications module 602 to send a preemption command to the job trackers of those clients to interrupt jobs run by the respective clients. When resources are freed up, the scheduling module sends a subsequent command to the job trackers that they may continue running the interrupted jobs.

In one embodiment, the cluster manager 110 includes a memory 608 configured to store session states that contain a mapping of resource requests to granted resources, outstanding requests from the job trackers, task status updates from task trackers 121A-N, and preempted jobs and the associated job tracker. The information stored in the memory 608 can be used by the other modules in the cluster manager 110.

Figure 7:
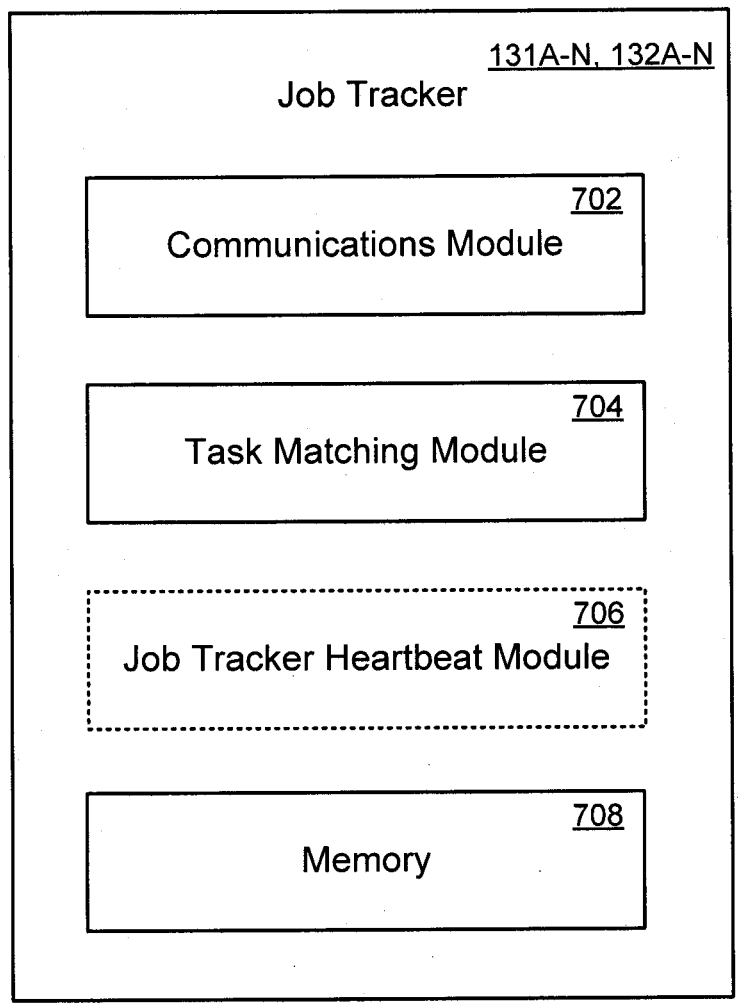
FIG. 7 depicts an exemplary architecture of a job tracker according to an embodiment of the present disclosure.

FIG. 7 is an example of an architecture of a job tracker 131A-N, 132A-N configured, for example, to send resource requests to and receive resource grants from the cluster manager 110. In the example of FIG. 7, the job tracker 131A-N, 132A-N (and all of the elements included within the job tracker 131A-N, 132A-N) is implemented by using programmable circuitry programmed by software and/or firmware, or by using special-purpose hardwired circuitry, or by using a combination of such embodiments.

In the example of FIG. 7, the job tracker 131A-N, 132A-N includes a communications module 702, a task matching module 704, and a memory 708. Job trackers 132A-N created inside the cluster can also include a job tracker heartbeat module 706. Additional or fewer components or modules can be included in the job tracker 131A-N, 132A-N and each illustrated component.

In one embodiment, the job tracker 131A-N, 132A-N includes a communications module 702 configured to receive job requests submitted by a client. The communications module 702 is also configured to send resource requests to and receive resource grants pushed from the cluster manager 110. In one embodiment, the job tracker 132A-N is created in the cluster, and the communications module 702 is configured to send heartbeats to the client to indicate that the job tracker is still running.

In one embodiment, the job tracker 131A-N, 132A-N includes a task matching module 704 configured to map a resource grant received from the cluster manager 110 that includes the specific task and the specific task tracker for the task to a resource request. Then the task matching module 704 in conjunction with the communications module 702 sends the task action to be performed to the task tracker identified in the resource grant.

In one embodiment, a job tracker 132A-N created inside the cluster includes a job tracker heartbeat module 706 configured to generate heartbeats to send to the client that created the job tracker. The job tracker heartbeat module 706 sends heartbeats in conjunction with the communications module 702 to inform the client that the job tracker is still running. In one embodiment, the heartbeats can also include status updates of tasks that are awaiting resources and tasks that are presently running on a machine in the cluster.

In one embodiment, the job tracker 132A-N includes a memory 708 configured to store the job requests submitted by the client and the resource grants mapped to the appropriate job request. The information stored in the memory 608 can be used by the other modules in the job tracker 132A-N.

Figure 8:
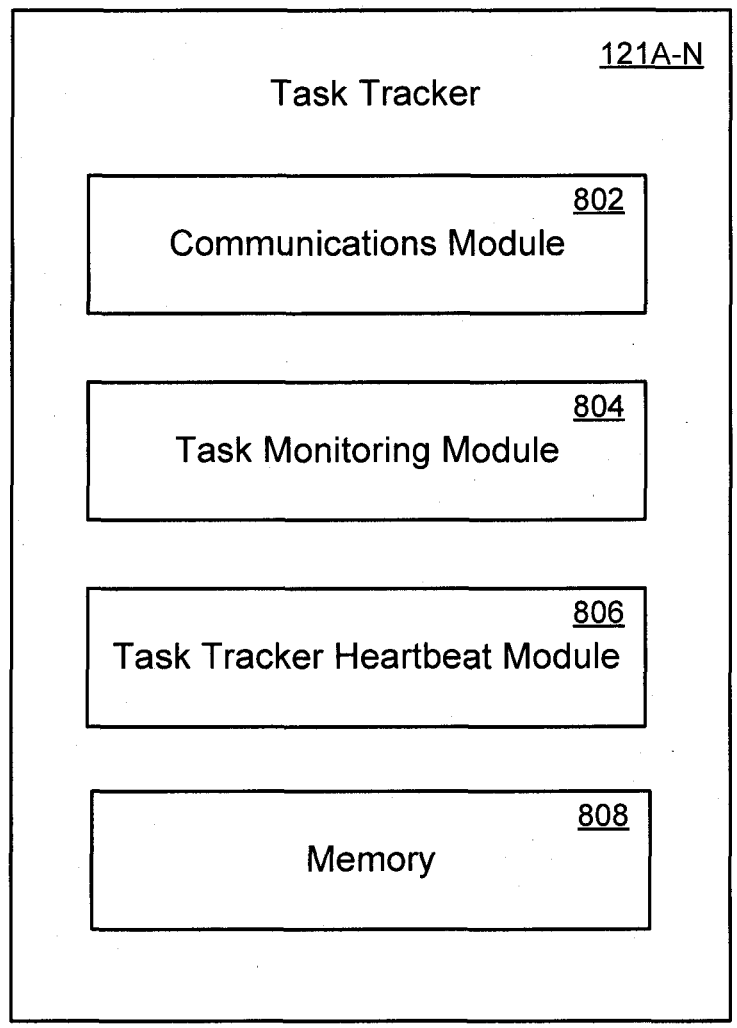
FIG. 8 depicts an exemplary architecture of a task tracker according to an embodiment of the present disclosure.

FIG. 8 is an example of an architecture of the task tracker 121A-N configured, for example, to receive task actions from job trackers 131A-N, 132A-N and to track performance of the tasks on the machine. In the example of FIG. 8, the task tracker 121A-N (and all of the elements included within the task tracker 121A-N) is implemented by using programmable circuitry programmed by software and/or firmware, or by using special-purpose hardwired circuitry, or by using a combination of such embodiments.

In the example of FIG. 8, the task tracker 121A-N includes a communications module 802, a task monitoring module 804, a task tracker heartbeat module 806, and a memory 808. Additional or fewer components or modules can be included in the task tracker 121A-N and each illustrated component.

In one embodiment, the task tracker 121A-N includes a communications module 802 configured to receive task actions from job trackers 131A-N, 132A-N, send heartbeats to the cluster manager 110, and send task progress information to the respective job tracker 131A-N, 132A-N.

In one embodiment, the task tracker 121A-N includes a task monitoring module 804 configured to monitor the status of tasks for which task actions have been received from job trackers 131A-N, 132A-N. The status of the tasks is sent as part of the heartbeats to the cluster manager 110 in conjunction with the task tracker heartbeat module 806 and the communications module 802.

In one embodiment, the task tracker 121A-N includes a task tracker heartbeat module 806 configured to generate heartbeats for sending to the cluster manager 110 in conjunction with the task monitoring module 804 and the communications module 802. The heartbeats inform the cluster manager 110 that the task tracker and associated machine is alive and the status of tasks running on the machine. Further, the heartbeat can include a quantitative description of the machine's capabilities as well as the number and type of tasks that are currently running on the machine.

In one embodiment, the task tracker 121A-N includes a memory 808 configured to store the task actions sent by the job tracker 131A-N, 132A-N and the status of running tasks. The information stored in the memory 608 can be used by the other modules in the task tracker 121A-N.

Figure 9:
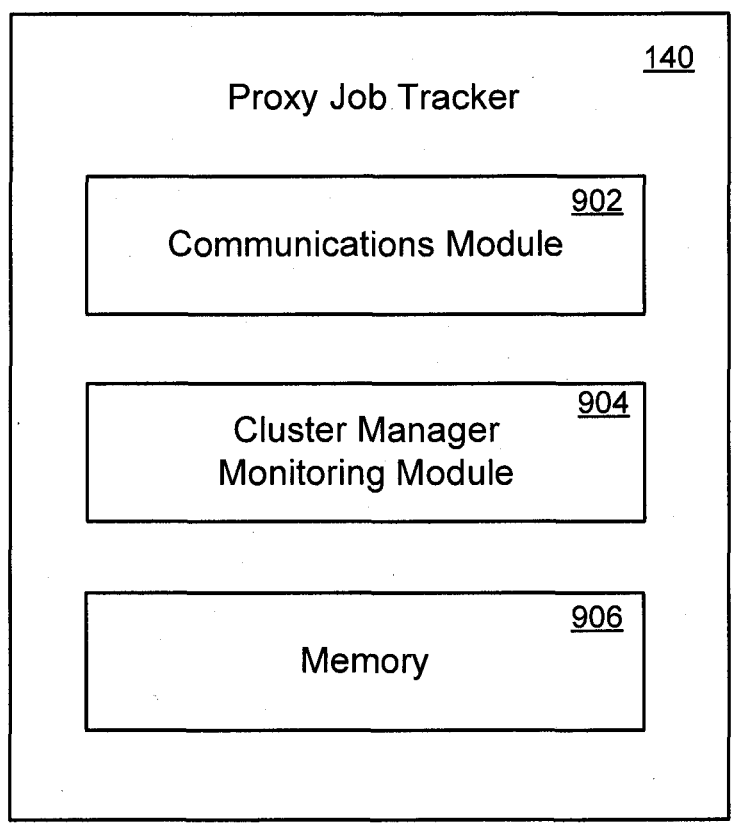
FIG. 9 depicts an exemplary architecture of a proxy job tracker according to an embodiment of the present disclosure.

FIG. 9 is an example of an architecture of the proxy job tracker 140 configured, for example, to respond to communications sent to the cluster manager 110 when the cluster manager is unavailable. In the example of FIG. 9, the proxy job tracker 140 (and all of the elements included within proxy job tracker 140) is implemented by using programmable circuitry programmed by software and/or firmware, or by using special-purpose hardwired circuitry, or by using a combination of such embodiments.

In the example of FIG. 9, the proxy job tracker 140 includes a communications module 902, a cluster manager monitoring module 904, and a memory 906. Additional or fewer components or modules can be included in the proxy job tracker 140 and each illustrated component.

In one embodiment, the proxy job tracker 140 includes a communications module 902 configured to receive resource requests from job trackers 131A-N, 132A-N when the cluster manager 110 is unavailable and to send a response to the requests that the cluster manager 110 is currently unavailable.

In one embodiment, the proxy job tracker 140 includes a cluster manager monitoring module 904 configured to monitor when the cluster manager 110 has been restarted and is available again. The cluster manager monitoring module 904 works in conjunction with the communications module 902 to update the job trackers 131A-N, 132A-N and any other entity that sent communications to the cluster manager 110 that the cluster manager 110 is available again.

In one embodiment, the proxy job tracker 140 includes a memory 908 configured to store communications to the cluster manager 110. The information stored in the memory 908 can be used by the other modules in the proxy job tracker 140.

Figure 10:
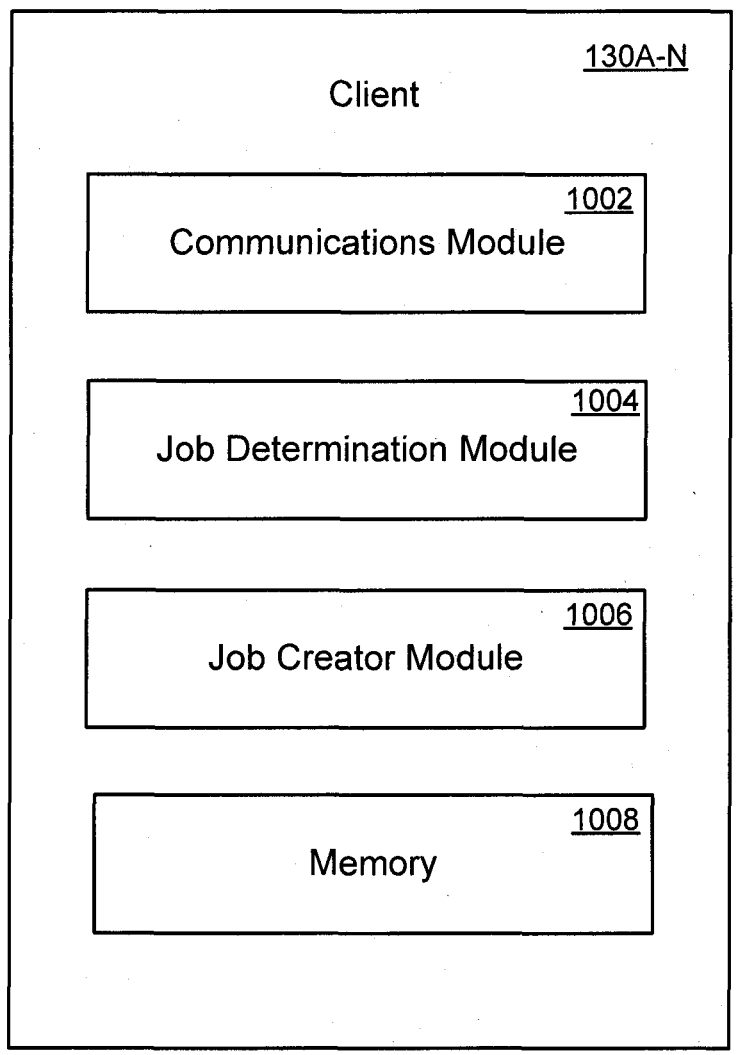
FIG. 10 depicts an exemplary architecture of a client according to an embodiment of the present disclosure.

FIG. 10 is an example of an architecture of the client 130A-N configured, for example, to determine jobs to be performed and to create a job tracker for submitting job requests to. In the example of FIG. 10, the client 130A-N (and all of the elements included within client 130A-N) is implemented by using programmable circuitry programmed by software and/or firmware, or by using special-purpose hardwired circuitry, or by using a combination of such embodiments.

In the example of FIG. 10, the client 130A-N includes a communications module 1002, a job determination module 1004, a job creator module 1006, and a memory 1006. Additional or fewer components or modules can be included in the client 130A-N and each illustrated component.

In one embodiment, the client 130A-N includes a communications module 1002 configured to receive commands from an external source to perform a certain function that involves running jobs on the cluster 120 and to create a job tracker 131A-N inside the client or to send a command to a machine to create a job tracker 132A-N inside the cluster 120.

In one embodiment, the client 130A-N includes a job determination module 1004 configured to determine the jobs to be run that results in the desired function sent by the external source. For each job that needs to be run, the job determination creates a job tracker 131A-N either inside the client or in conjunction with the communications module 1002 creates a job tracker 132A-N inside the cluster 120.

The job determination module 1004 is also configured to determine the number of tasks needed to execute a job. The number of tasks is compared with a preset threshold value or a threshold value identified by the external source. If the number of tasks is no more than the threshold number, the job determination module 1004 in conjunction with the job creator module 1006 create a job tracker 131A-N inside the client, otherwise the job determination module 1004 in conjunction with the job creator module 1006 and the communications module 1002 send a command to a machine in the cluster 120 to create a job tracker 132A-N inside the cluster 120. In some instances, the job determination module 1004 may also take into account a relative location of the client and the cluster in determining the preset threshold number to be used for comparing tasks.

In one embodiment, the client 130A-N includes a memory 1008 configured to store threshold values, commands from an external source, and job trackers that are created, both inside the client and inside the cluster. The information stored in the memory 1008 can be used by the other modules in the client 130A-N.

While the above-described cluster management techniques discussed the scheduling of map tasks and reduce tasks by the cluster manager 110, the cluster manager can schedule other types of tasks. In fact, any application that performs scheduling can benefit from these cluster management techniques, for example, pool-based scheduling for different classes of jobs and different users can be implemented.

The cluster management techniques disclosed herein provide benefits including lower latencies for jobs, higher cluster utilization, better fairness in scheduling, and the ability to integrate with other systems for scheduling.

Social Networking System Architecture

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, manufacturers. The social networking system allows its users to interact with each other as well as with other objects maintained by the social networking system. In some embodiments, the social networking system allows users to interact with third-party websites and financial account providers.

Based on stored data about users, objects and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 11:
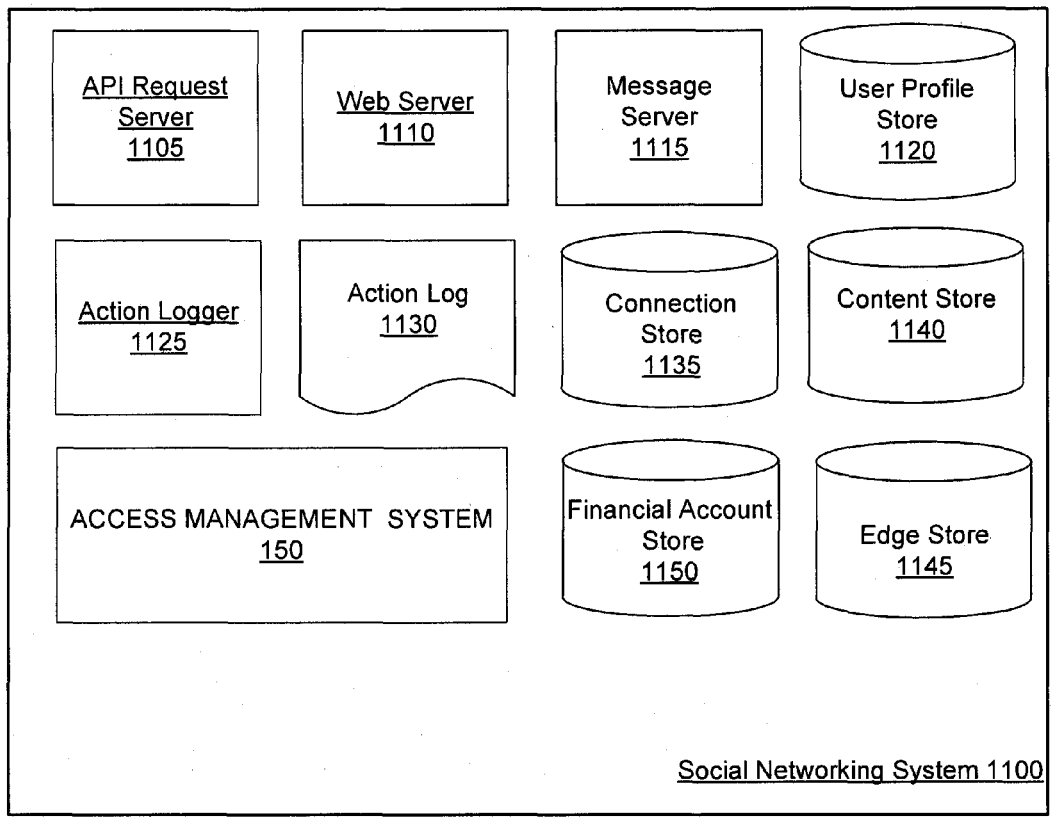
FIG. 11 is a block diagram of a system architecture of the social networking system with which some embodiments of the present invention may be utilized.

FIG. 11 is a block diagram of a system architecture of the social networking system 1100 with which some embodiments of the present invention may be utilized. Social networking system 1100 illustrated by FIG. 11 includes API request server 1105, web server 1110, message server 1115, user profile store 1120, action logger 1125, action log 1130, connection store 1135, content store 1140, edge store 1145, and financial account store 1150. Information in the user profile store 1120, content store 1140, connection store 1135, edge store 1145, financial account store 1150, and/or action log 1130 can be stored in a cluster 120, 185, 186. Data stored in the cluster 120, 185, 186 can be accessed analyzed and/or processed by client jobs run by job trackers 130A-N and tasks tracked by task trackers 121A-N. In other embodiments, social networking system 1100 may include additional, fewer, or different modules for various applications. Conventional components such as network interfaces, security mechanisms, load balancers, failover servers, management and network operations consoles, and the like are not shown so as to not obscure the details of the system architecture.

API request server 1105 allows other systems, user devices, or tools to access information from social networking system 1100 by calling APIs. The information provided by the social network may include user profile information or the connection information of users as determined by their individual privacy settings. For example, a system, user device, or tools interested in accessing data connections within a social networking system may send an API request to social networking system 1100 via a network. The API request is received at social networking system 1100 by API request server 1105. API request server 1105 processes the request by submitting the access request to access management system 150 where access is determined and any data communicated back to the requesting system, user device, or tools via a network.

Web server 1110 links social networking system 1100 via a network to one or more client devices; the web server serves web pages, as well as other web-related content, such as Java, Flash, XML, and so forth. The web server 1110 may communicate with the message server 1115 that provides the functionality of receiving and routing messages between social networking system 1100 and client devices. The messages processed by message server 1115 can be instant messages, queued messages (e.g., email), text and SMS (short message service) messages, or any other suitable messaging technique. In some embodiments, a message sent by a user to another can be viewed by other users of social networking system 1100, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 1100 is associated with a user profile, which is stored in user profile store 1120. A user profile includes declarative information about the user that was explicitly shared by the user, and may also include profile information inferred by social networking system 1100. In one embodiment, a user profile includes multiple data fields, each data field describing one or more attributes of the corresponding user of social networking system 1100. The user profile information stored in user profile store 1120 describes the users of social networking system 1100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking system 1100 displayed in an image. A user profile in user profile store 1120 may also maintain references to actions by the corresponding user performed on content items in content store 1140 and stored in the edge store 1145.

A user profile may be associated with one or more financial accounts, allowing the user profile to include data retrieved from or derived from a financial account. A user may specify one or more privacy settings, which are stored in the user profile, that limit information from a financial account that social networking system 1100 is permitted to access. For example, a privacy setting limits social networking system 1100 to accessing the transaction history of the financial account and not the current account balance. As another example, a privacy setting limits social networking system 1100 to a subset of the transaction history of the financial account, allowing social networking system 1100 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by social networking system 1100. In one embodiment, information from the financial account is stored in user profile store 1120. In other embodiments, it may be stored in financial account store 1150.

Action logger 1125 receives communications about user actions on and/or off social networking system 1100, populating action log 1130 with information about user actions. Such actions may include, for example, adding a connection to another user, sending a message to another user, uploading an image, reading a message from another user, viewing content associated with another user, attending an event posted by another user, among others. In some embodiments, action logger 1125 receives, subject to one or more privacy settings, transaction information from a financial account associated with a user and identifies user actions from the transaction information. For example, action logger 1125 retrieves vendor identifiers from the financial account's transaction history and identifies an object, such as a page, in social networking system 1100 associated with the vendor identifier. This allows action logger 1125 to identify a user's purchases of products or services that are associated with a page, or another object, in content store 1140. In addition, a number of actions described in connection with other objects are directed at particular users, so these actions are associated with those users as well. These actions are stored in action log 1130.

Action log 1130 may be used by social networking system 1100 to track user actions on social networking system 1100, as well as external website that communicate information to social networking system 1100. Users may interact with various objects on social networking system 1100, including commenting on posts, sharing links, and checking-in to physical locations via a mobile device, accessing content items in a sequence or other interactions. Information describing these actions is stored in action log 1130. Additional examples of interactions with objects on social networking system 1100 included in action log 1130 include commenting on a photo album, communications between users, becoming a fan of a musician, adding an event to a calendar, joining a groups, becoming a fan of a brand page, creating an event, authorizing an application, using an application and engaging in a transaction. Additionally, action log 1130 records a user's interactions with advertisements on social networking system 1100 as well as other applications operating on social networking system 1100. In some embodiments, data from action log 1130 is used to infer interests or preferences of the user, augmenting the interests included in the user profile and allowing a more complete understanding of user preferences.

Action log 1130 may also store user actions taken on external websites and/or determined from a financial account associated with the user. For example, an e-commerce website that primarily sells sporting equipment at bargain prices may recognize a user of social networking system 1100 through social plug-ins that enable the e-commerce website to identify the user of social networking system 1100. Because users of social networking system 1100 are uniquely identifiable, e-commerce websites, such as this sporting equipment retailer, may use the information about these users as they visit their websites. Action log 1130 records data about these users, including webpage viewing histories, advertisements that were engaged, purchases made, and other patterns from shopping and buying. Actions identified by action logger 1125 from the transaction history of a financial account associated with the user allow action log 1130 to record further information about additional types of user actions.

Content store 1140 stores content items associated with a user profile, such as images, videos or audio files. Content items from content store 1140 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 1100. Examples of social networking content items include suggested connections or suggestions to perform other actions, media provided to, or maintained by, social networking system 1100 (e.g., pictures or videos), status messages or links posted by users to the social networking system, events, groups, pages (e.g., representing an organization or commercial entity), and any other content provided by, or accessible via, the social networking system.

Content store 1140 also includes one or more pages associated with entities having user profiles in user profile store 1120. An entity is a non-individual user of social networking system 1100, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 1140, allowing social networking system users to more easily interact with the vendor via social networking system 1100. A vendor identifier is associated with a vendor's page, allowing social networking system 1100 to identify the vendor and/or to retrieve additional information about the vendor from user profile store 1120, action log 1130 or from any other suitable source using the vendor identifier. In some embodiments, the content store 1140 may also store one or more targeting criteria associated with stored objects and identifying one or more characteristics of a user to which the object is eligible to be presented.

In one embodiment, edge store 1145 stores the information describing connections between users and other objects on social networking system 1100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 1100, such as expressing interest in a page on the social networking system, sharing a link with other users of the social networking system, and commenting on posts made by other users of the social networking system. Edge store 1145 stores edge objects that include information about the edge, such as affinity scores for objects, interests, and other users. Affinity scores may be computed by social networking system 1100 over time to approximate a user's affinity for an object, interest, and other users in social networking system 1100 based on the actions performed by the user. Multiple interactions between a user and a specific object may be stored in one edge object in edge store 1145, in one embodiment. In some embodiments, connections between users may be stored in user profile store 1120, or user profile store 1120 may access edge store 1145 to determine connections between users.

Figure 12:
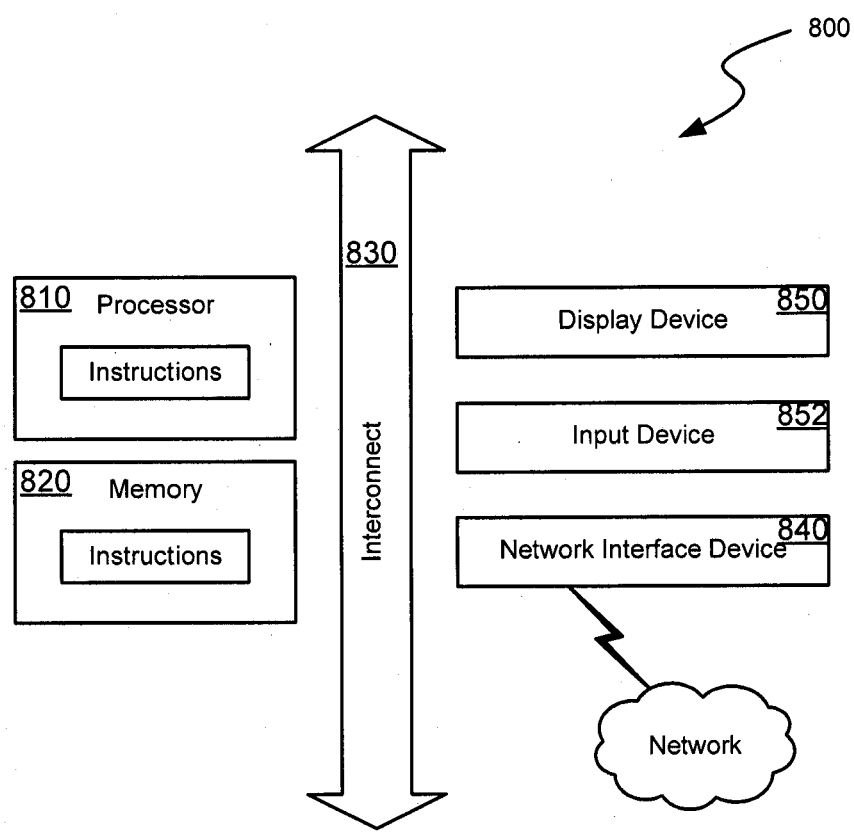
FIG. 12 is a block diagram showing an example of the architecture for a processing system that can be utilized to implement the cluster management techniques according to an embodiment of the present disclosure.

FIG. 12 is a block diagram showing an example of the architecture for a system 800 that can be utilized to implement the techniques described herein. The system 800 can reside in the client, cluster manager, job tracker, task tracker, or proxy job tracker. In FIG. 12, the system 800 includes one or more processors 810 and memory 820 connected via an interconnect 830. The interconnect 830 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 810 can include central processing units (CPUs) that can execute software or firmware stored in memory 820. The processor(s) 810 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 820 represents any form of memory, such as random access memory (RAM), read-only memory (ROM), flash memory, or a combination of such devices. In use, the memory 820 can contain, among other things, a set of machine instructions which, when executed by processor 810, causes the processor 810 to perform operations to implement embodiments of the present invention.

Also connected to the processor(s) 810 through the interconnect 830 is a network interface device 840. The network interface device 840 provides the system 800 with the ability to communicate with remote devices, and may be, for example, an Ethernet adapter or Fiber Channel adapter.

The system 800 can also include one or more optional input devices 852 and/or optional display devices 850. Input devices 852 can include a keyboard, a mouse or other pointing device. The display device 850 can include a cathode ray tube (CRT), liquid crystal display (LCD), or some other applicable known or convenient display device.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A system, comprising:
    a machine cluster comprising a plurality of server computing devices for running tasks;
    a cluster manager configured to track available resources in the machine cluster; and
    a job tracker configured to submit to the cluster manager a resource request for a task to be run in the machine cluster, wherein the job tracker is created at a client computing device external to the machine cluster and runs at the client computing device;
    wherein the cluster manager, in response to the resource request, sends a push-based notification to the job tracker when a resource is available in the machine cluster for running the task.

2. The system of claim 1, wherein each of the plurality of server computing devices is configured to run a plurality of tasks and a task tracker, wherein each task tracker monitors a status of the plurality of tasks running on its corresponding server computing device and sends a status of the running tasks and a description of capabilities of the server computing device to the cluster manager, and further wherein the cluster manager tracks available resources in the machine cluster based on information received from the task trackers.

3. The system of claim 1, wherein the notification comprises a resource grant that identifies a particular server computing device in the machine cluster for running the task.

4. The system of claim 1, wherein the job tracker is created by a client computing device and runs at the machine cluster.

5. The system of claim 1, wherein the job tracker sends heartbeats to the client computing device to inform the client computing device that the job tracker is running.

6. The system of claim 1, further comprising a proxy job tracker configured to respond to requests sent to the cluster manager when the cluster manager is unavailable.

7. The system of claim 1, wherein the job tracker runs a single job comprising one or more tasks, and further wherein the job tracker submits a separate resource request to the machine cluster manager for each task, and the job tracker receives a separate resource grant from the cluster manager for each task.

8. The system of claim 1, wherein the cluster manager implements fair share scheduling of the machine cluster's resources wherein the cluster resources are equally distributed among clients.

9. The system of claim 8, wherein the cluster manager sends to the job tracker a preemption command to interrupt the job tracker's task when tasks running in the machine cluster for the client computing device corresponding to the job tracker consume an unfair portion of the machine cluster's resources.

10. A method, comprising:
    pausing a cluster manager of a machine cluster, wherein the cluster manager matches a resource request from a job tracker to available resources in the machine cluster and sends a resource grant to the job tracker when resources are available for the resource request, wherein the job tracker is created at a client computing device external to the machine cluster and runs at the client computing device;
    saving to a storage a plurality of session states for the cluster manager, wherein each session state includes a mapping of resource requests to resource grants;
    restarting the cluster manager;
    reading the plurality of session states from the storage, wherein the restarted cluster manager has a same state as before the restart; and
    resuming jobs associated with the plurality of session states that were running before the cluster was restarted and were awaiting a response from the cluster manager.

11. The method of claim 10, further comprising, in an event the cluster manager is unavailable during a restart, receiving at a proxy job tracker from a first job tracker a first resource request transmitted to the cluster manager, wherein the proxy job tracker responds to the first job tracker that the cluster manager is unavailable.

12. The method of claim 10, wherein the job tracker sends to a task tracker running on a server computing device identified in the resource grant a task action to be performed and receives task progress information from the task tracker, and further wherein the task action continues to be performed on the identified server computing device while the cluster manager is unavailable while being restarted unless a response is needed from the cluster manager.

13. The method of claim 12, further comprising, in an event the cluster manager is unavailable during a restart, receiving at a proxy job tracker from the task tracker a heartbeat intended for the cluster manager, wherein the proxy job tracker responds to the task tracker that the cluster manager is unavailable.

14. The method of claim 13, wherein the heartbeat includes a description of the machine's capabilities and a number and type of tasks currently running on the machine.

15. A method, comprising:
    creating a job tracker at a client computing device external to a machine cluster, wherein the job tracker is configured to request resource for a single job to be run in the machine cluster comprising a plurality of server computing devices;
    running the job tracker at the client computing device;
    receiving periodic communications by the client computing device from the job tracker; and
    upon interruption of the periodic communications from the job tracker, restarting the job tracker by the client computing device.

16. The method of claim 15, further comprising, in an event that periodic communications from the restarted job tracker do not resume, waiting a period of time before restarting the job tracker.

17. The method of claim 15, wherein the job tracker sends a resource request for each task to be run in the machine cluster to a cluster manager and waits for a resource grant to identify which server computing device in the machine cluster the task can be sent to.

18. The method of claim 17, wherein the job tracker sends to a task tracker running on the identified server computing device a task action to be performed and receives task progress information from the task tracker.

19. The method of claim 18, wherein the periodic communications from the job tracker include at least some of the task progress information.

20. The method of claim 15, further comprising:
   determining whether to run the job tracker at the client computing device by deciding whether the single job associated with the job tracker includes a number of tasks that is less than a threshold number.

21. The method of claim 20, further comprising:
   setting the threshold number higher in an event the client and the cluster are located at a common datacenter.

\* \* \* \* \*